US012330555B2

(12) United States Patent
Miyata et al.

(10) Patent No.: US 12,330,555 B2
(45) Date of Patent: Jun. 17, 2025

(54) STEERING WHEEL (71) Applicant: TOYODA GOSEI CO., LTD., Kiyosu (JP)

(72) Inventors: Sayaka Miyata, Aichi-ken (JP); Takanori Yamada, Aichi-ken (JP); Fumiyasu Kojima, Aichi-ken (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/540,087

(22) Filed: Dec. 14, 2023

(65) Prior Publication Data
US 2024/0199108 A1 Jun. 20, 2024

(30) Foreign Application Priority Data
Dec. 19, 2022 (JP) .................. 2022-202488

(51) Int. Cl.
*B60Q 3/283* (2017.01)
*B60Q 3/14* (2017.01)
*B60Q 3/78* (2017.01)
*B62D 1/04* (2006.01)
*F21V 33/00* (2006.01)

(52) U.S. Cl.
CPC .............. *B60Q 3/283* (2017.02); *B60Q 3/14* (2017.02); *B60Q 3/78* (2017.02); *B62D 1/04* (2013.01); *F21V 33/00* (2013.01)

(58) Field of Classification Search
CPC . B60Q 3/283; B60Q 3/14; B60Q 3/78; B62D 1/04; B62D 15/029; F21V 33/00
USPC ........................................................ 362/488
See application file for complete search history.

(56) References Cited

U.S. PATENT DOCUMENTS

| 11,390,211 | B2* | 7/2022 | Kihara | ..................... B60Q 3/62 |
| 2014/0111324 | A1* | 4/2014 | Lisseman | ............... B60K 35/00 |
| | | | | 74/552 |
| 2016/0025281 | A1* | 1/2016 | Gardner | ................. B62D 1/046 |
| | | | | 362/520 |
| 2019/0016383 | A1* | 1/2019 | Spencer | .................. B60K 35/00 |
| 2019/0227218 | A1* | 7/2019 | Kawano | ............... G02B 6/0091 |
| 2021/0221285 | A1 | 7/2021 | Kihara et al. | |
| 2023/0242180 | A1* | 8/2023 | Kojima | ................ G02B 6/0068 |
| | | | | 362/511 |

FOREIGN PATENT DOCUMENTS

| JP | H03-116085 A | 5/1991 |
| JP | H04-284487 A | 10/1992 |
| JP | 2021-113040 A | 8/2021 |

* cited by examiner

Primary Examiner — Laura K Tso
(74) Attorney, Agent, or Firm — Posz Law Group, PLC (57) ABSTRACT A steering wheel includes a boss portion connected to a steering center shaft of a vehicle, a steering part to be gripped by a driver of the vehicle and steered by being rotated about the steering center shaft, a light source provided inside the steering part, and a light emission portion provided on the steering part. The light emission portion transmits light emitted from the light source to emit the light from a rear surface of the steering part. A surface of the light emission portion is provided with a matte layer having transparency and containing fine particles for matting.

4 Claims, 8 Drawing Sheets

STEERING WHEEL

CROSS-REFERENCE TO RELATED APPLICATIONS

This application is based on and claims priority under 35 USC 119 from Japanese Patent Application No. 2022-202488 filed on Dec. 19, 2022, the entire content of which is incorporated herein by reference.

TECHNICAL FIELD

The present disclosure relates to a steering wheel to be mounted on a vehicle.

BACKGROUND ART

In a steering wheel, there has been known a configuration in which a light source is provided inside a steering part that is gripped by a driver and steered by being rotated, and predetermined information is transmitted to the driver by emitting light from a rear surface (a surface on a driver side) of the steering part (for example, JP2021-113040A).

In the steering wheel that emits light from the rear surface of the steering part as described above, there is a possibility that the light emitted from the light source is less likely to be recognized by the driver due to an influence of the sun light reflected by a surface of the steering part during daytime driving.

SUMMARY OF INVENTION

An object of the present disclosure is to provide a steering wheel capable of preventing a driver from having difficulty in recognizing light emitted from a light source inside a steering part due to an influence of sun light.

According to an aspect of the present disclosure, there is provided a steering wheel including: a boss portion connected to a steering center shaft of a vehicle; a steering part configured to be gripped by a driver of the vehicle and steered by being rotated about the steering center shaft; a light source provided inside the steering part; and a light emission portion provided on at least a portion of the steering part, and configured to transmit light emitted from the light source to emit the light from a rear surface of the steering part, in which a surface of the light emission portion is provided with a matte layer having transparency and containing fine particles for matting.

According to the aspect of the present disclosure, it is possible to prevent the driver from having the difficulty in recognizing the light emitted from the light source inside the steering part due to the influence of the sun light.

BRIEF DESCRIPTION OF DRAWINGS

Exemplary embodiment(s) of the present invention will be described in detail based on the following figures, wherein.

DESCRIPTION OF EMBODIMENTS

Hereinafter, a steering wheel 10 according to an embodiment of the present disclosure will be described. The dimensions, materials, shapes, and relative arrangements of the components described below are not intended to limit the scope of the present invention to those described below, unless otherwise specified.

Figure 1:
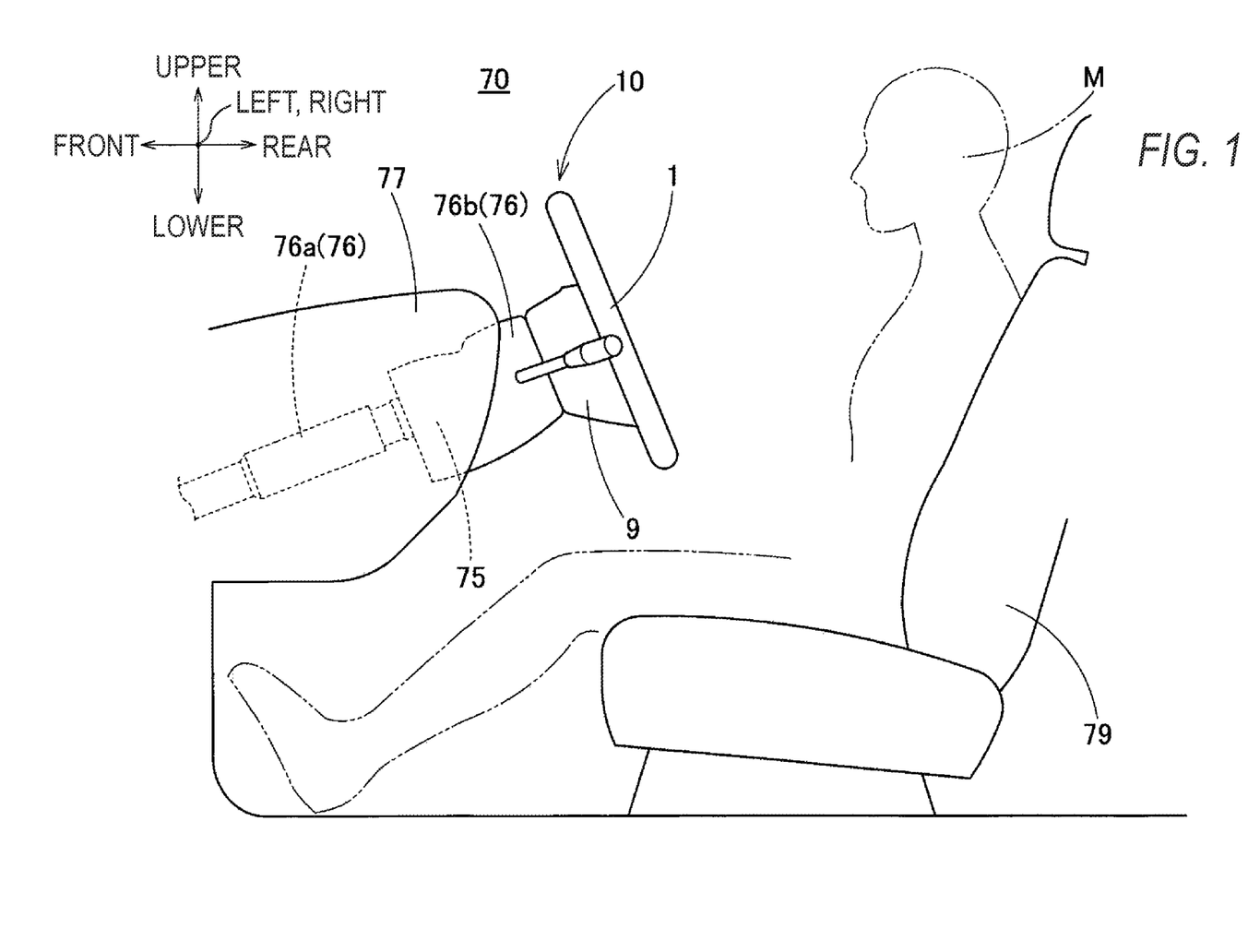
FIG. 1 is a left side view of a periphery of a driver's seat of a vehicle equipped with a steering wheel according to an embodiment of the present disclosure.
Figure 2:
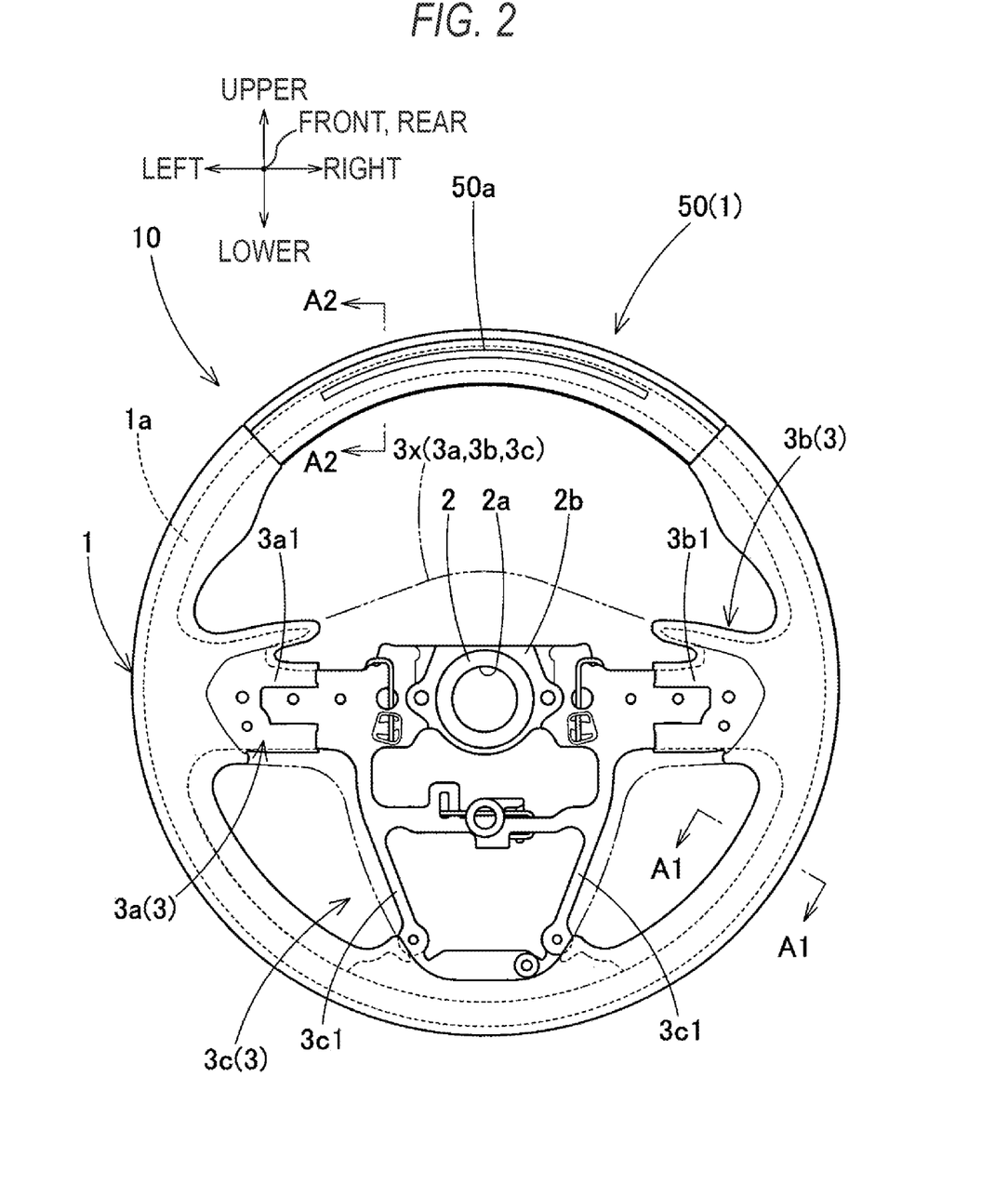
FIG. 2 is a front view of the steering wheel.
Figure 3:
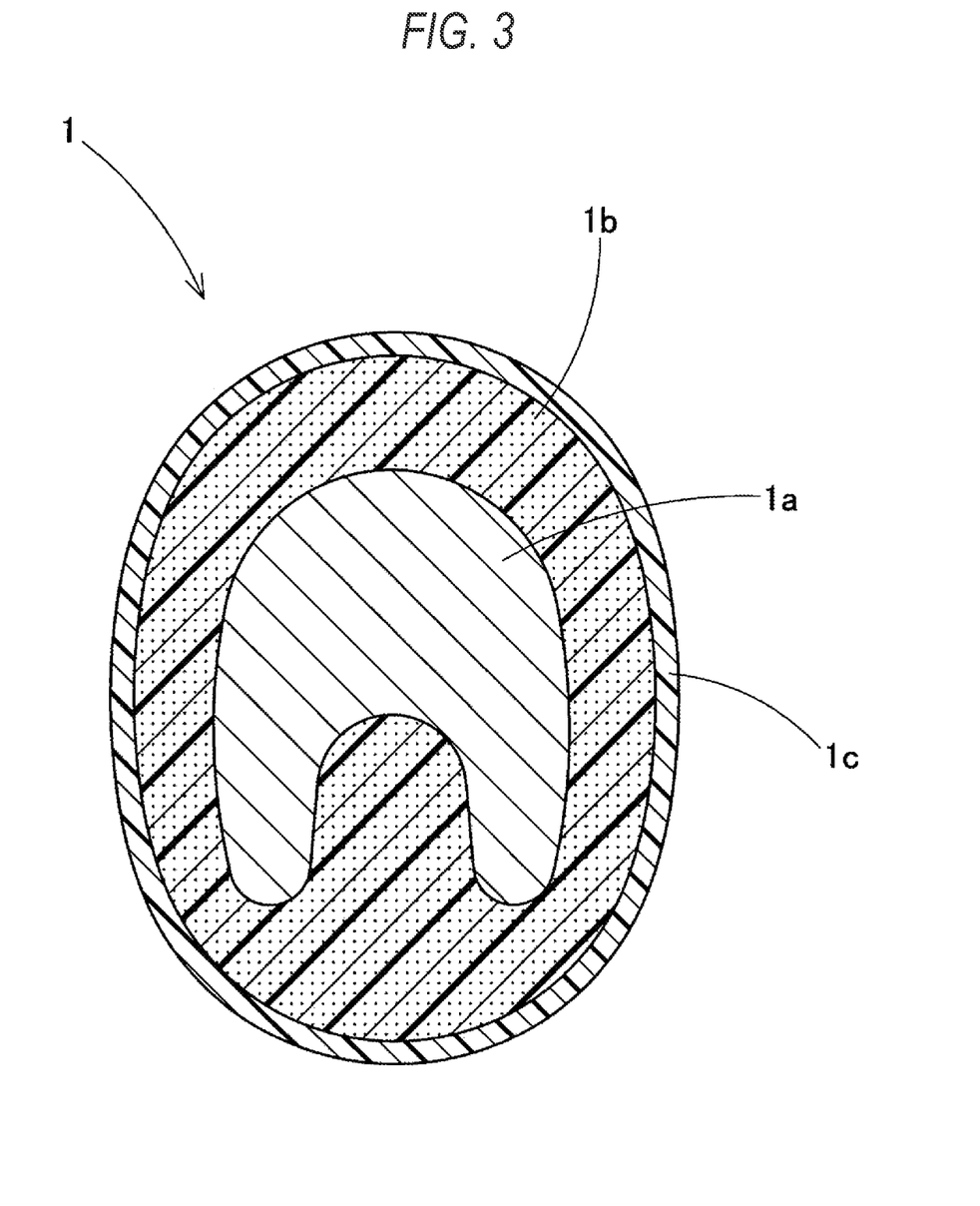
FIG. 3 is a cross-sectional view of a steering part of the steering wheel.

FIG. 1 is a left side view of a periphery of a driver's seat 79 of a vehicle 70 equipped with the steering wheel 10 according to the present embodiment. FIG. 2 is a front view of the steering wheel 10, and for convenience, a pad 3x is made transparent, and only the outline thereof is indicated by a two-dot chain line. FIG. 3 is a cross-sectional view of the steering part 1 of the steering wheel 10 taken along a line A1-A1 illustrated in FIG. 2.

In the following description, each direction described in relation to the steering wheel 10 means a direction in a state where the steering wheel 10 is mounted on the vehicle 70 illustrated in FIG. 1. That is, a left-right direction means a left direction and a right direction of the vehicle 70 on which the steering wheel 10 is mounted, specifically, a left direction and a right direction viewed from a driver M of the vehicle 70. A front-rear direction means a front direction and a rear direction of the vehicle 70, specifically, a front direction and a rear direction viewed from the driver M. An upper-lower direction means an upper direction and a lower direction in a vertical direction.

As illustrated in FIG. 1, the steering wheel 10 is mounted on the vehicle 70 by being connected to a steering shaft 75 serving as a steering shaft. The vehicle 70 includes a steering column 76 including a column tube 76a that supports the steering shaft 75 by partially covering an outer peripheral portion of the steering shaft 75, and a column cover 76b that covers a portion of the steering shaft 75 protruding rearward from an instrument panel 77. The steering wheel 10 is attached to a distal end of the steering shaft 75 protruding rearward from the instrument panel 77.

As illustrated in FIGS. 2 and 3, the steering wheel 10 includes the steering part 1 gripped by the driver M of the vehicle 70, a boss portion 2 disposed inside the steering part 1 and connected to the steering shaft 75, and a spoke portion 3 connecting the steering part 1 and the boss portion 2. The steering wheel 10 includes a front cover 9 (FIG. 1) on a front side thereof.

The steering part 1 is a circular ring-shaped member that is gripped by the driver M and steered by being rotated. A lighting unit 50 that constitutes a part of the steering part 1 and transmits predetermined information to the driver M by being turned on is provided on an upper portion of the steering part 1 (a region between spoke portions 3a and 3b). The lighting unit 50 has a light source therein and emits light toward the driver M from a light emission portion 50a provided on a rear surface of the lighting unit 50. Since the lighting unit 50 constitutes a part of the steering part 1, the rear surface of the lighting unit 50 may be referred to as a rear surface of the steering part 1 (a surface on the driver M side). The detailed configuration of the lighting unit 50 will be described later.

A portion of the steering part 1 other than the lighting unit 50 is formed by laminating an intermediate layer 1*b* and a skin layer 1*c* in this order on a metallic core member 1*a* having a substantially inverted U-shape in cross section. The intermediate layer 1*b* is formed of a material having a cushioning property such as polyurethane foam. The skin layer 1*c* is formed of leather such as natural leather or synthetic leather.

The boss portion 2 is a metal member disposed at a center of the steering part 1 and connected to the steering shaft 75. The boss portion 2 has a shaft hole 2*a* through which the steering shaft 75 is inserted, and the boss portion 2 and the steering shaft 75 are connected to each other by fixing a distal end portion of the steering shaft 75 with a nut in a state where the tip end portion of the steering shaft 75 is inserted and fitted into the shaft hole 2*a*. In addition, the boss portion 2 is integrally molded with a metallic core member 2*b*.

In the present embodiment, the core member 1*a* of the steering part 1, the core member 2*b* of the boss portion 2, and core members 3*a*1, 3*b*1, and 3*c*1 of the spoke portion 3 to be described later are integrally molded by die casting, thereby connecting the steering part 1, the boss portion 2, and the spoke portion 3. However, the core member 1*a* of the steering part 1, the core member 2*b* of the boss portion 2, and the core members 3*a*1, 3*b*1, and 3*c*1 of the spoke portion 3 may be separately formed and connected by welding or the like.

The spoke portion 3 includes spoke portions 3*a* and 3*b* extending from the boss portion 2 to left and right sides, respectively, and a spoke portion 3*c* extending from the boss portion 2 to a rear side. The spoke portions 3*a* and 3*b* have the metallic core members 3*a*1 and 3*b*1 respectively extending to the left and right sides so as to connect the core member 1*a* of the steering part 1 and the core member 2*b* of the boss portion 2. The spoke portion 3*c* has a metallic core member 3*c*1 that extends rearward from the core member 2*b* of the boss portion 2 and is connected to the core member 1*a* of the steering part 1 while being branched to the left and right. In addition, the spoke portions 3*a*, 3*b*, and 3*c* have resin pads 3*x* that cover the core members 3*a*1, 3*b*1, and 3*c*1.

The driver M holds the steering part 1 with both hands and steers the steering part 1 by rotating it about the steering shaft 75, thereby mechanically rotating tires of the vehicle 70 via the steering shaft 75 to change a traveling direction of the vehicle 70. A steering by-wire system in which a sensor (not illustrated) that detects a rotation angle of the steering part 1 is provided with the steering wheel 10, and the vehicle 70 turns the tires according to a detection result of the sensor may be adopted.

When a continuous driving time of the vehicle 70 is equal to or longer than a predetermined time, the lighting unit 50 is turned on to alert the driver M. Note that a lighting timing of the lighting unit 50 is not limited to this, and for example, in a case in which the vehicle 70 is in an automated driving mode, the lighting unit 50 may be turned on at the time of switching between a normal driving mode and the automated driving mode.

Figure 4:
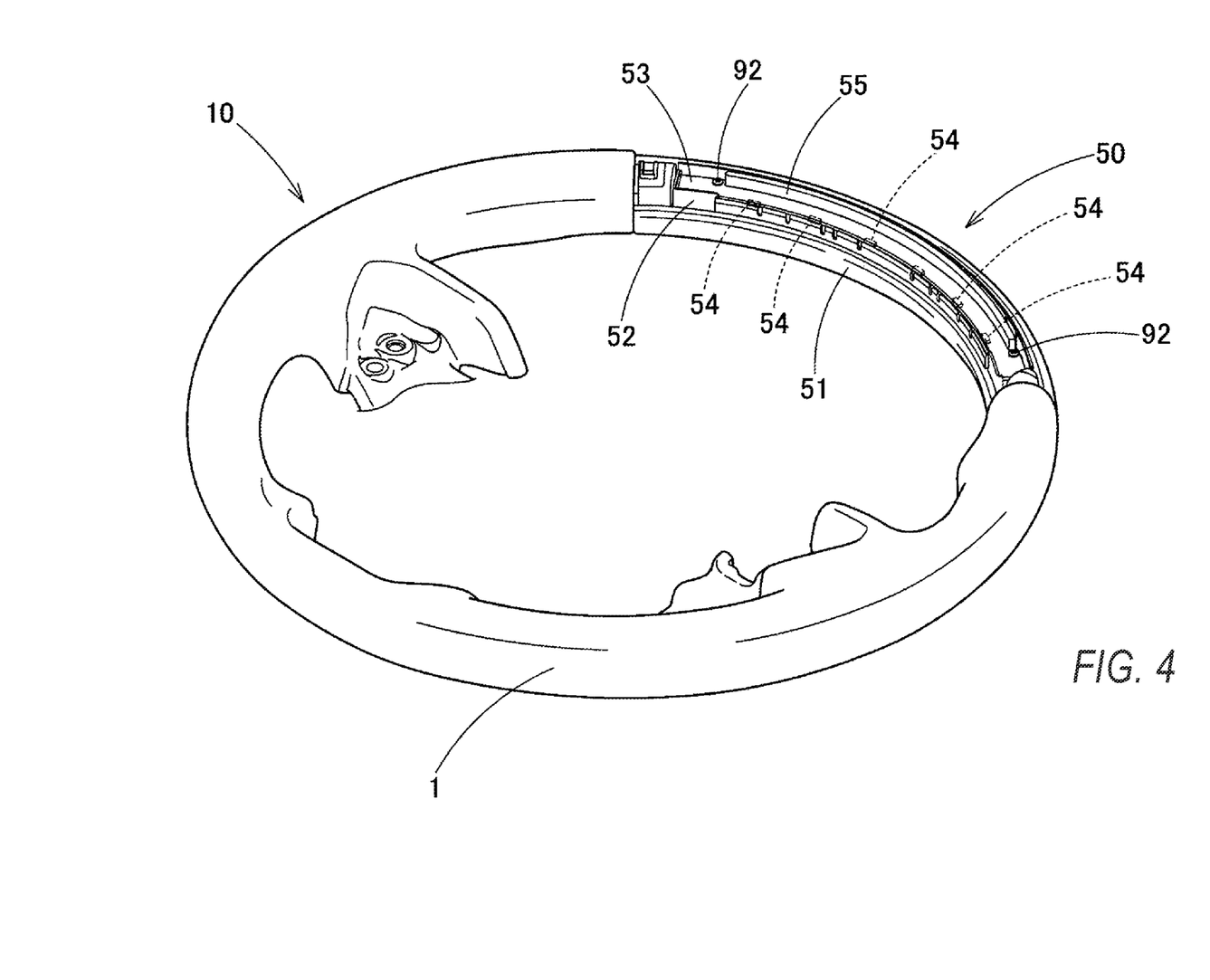
FIG. 4 is a perspective view of a lighting unit of the steering part with a rear cover thereof removed.
Figure 5:
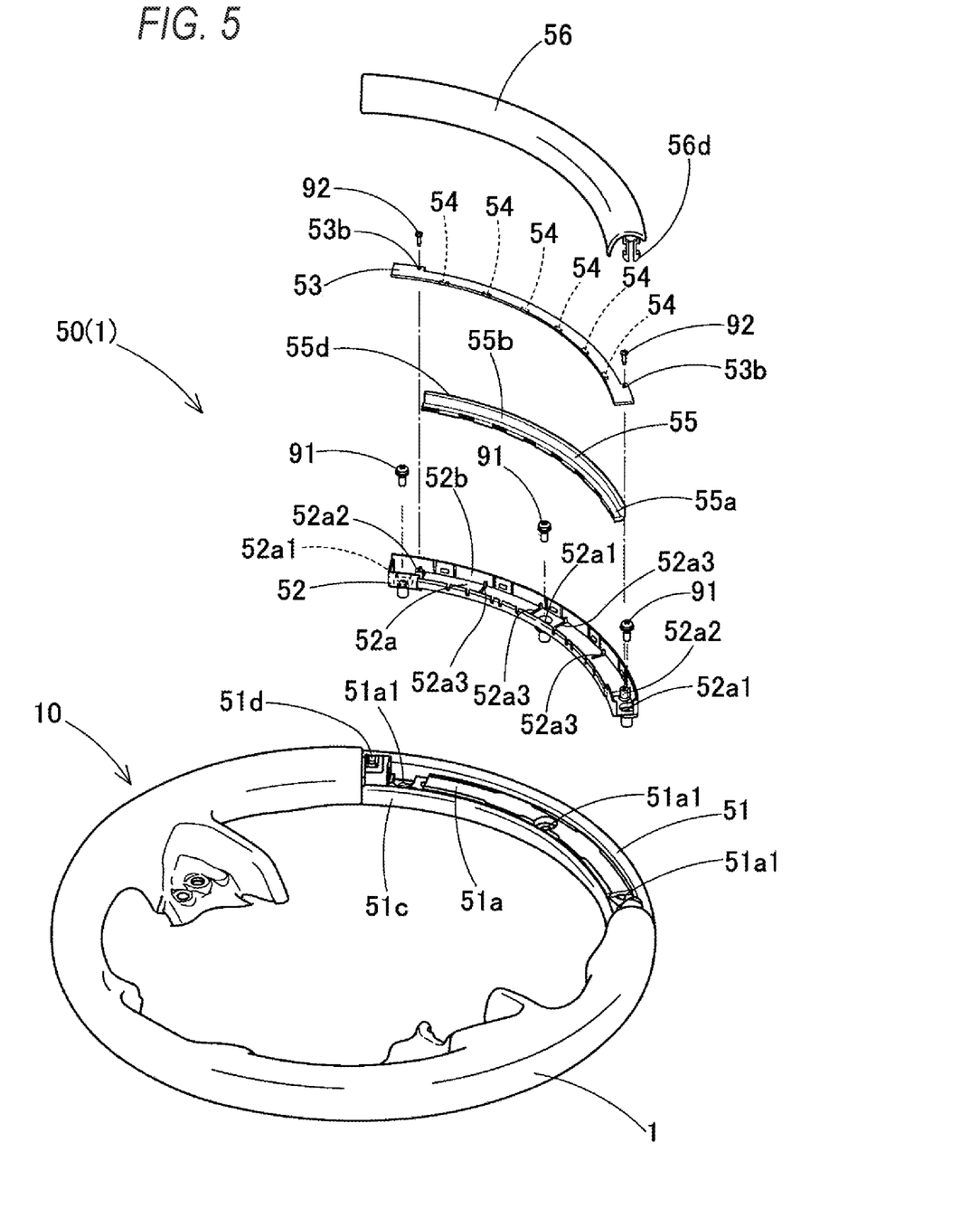
FIG. 5 is an exploded perspective view of the lighting unit.
Figure 6:
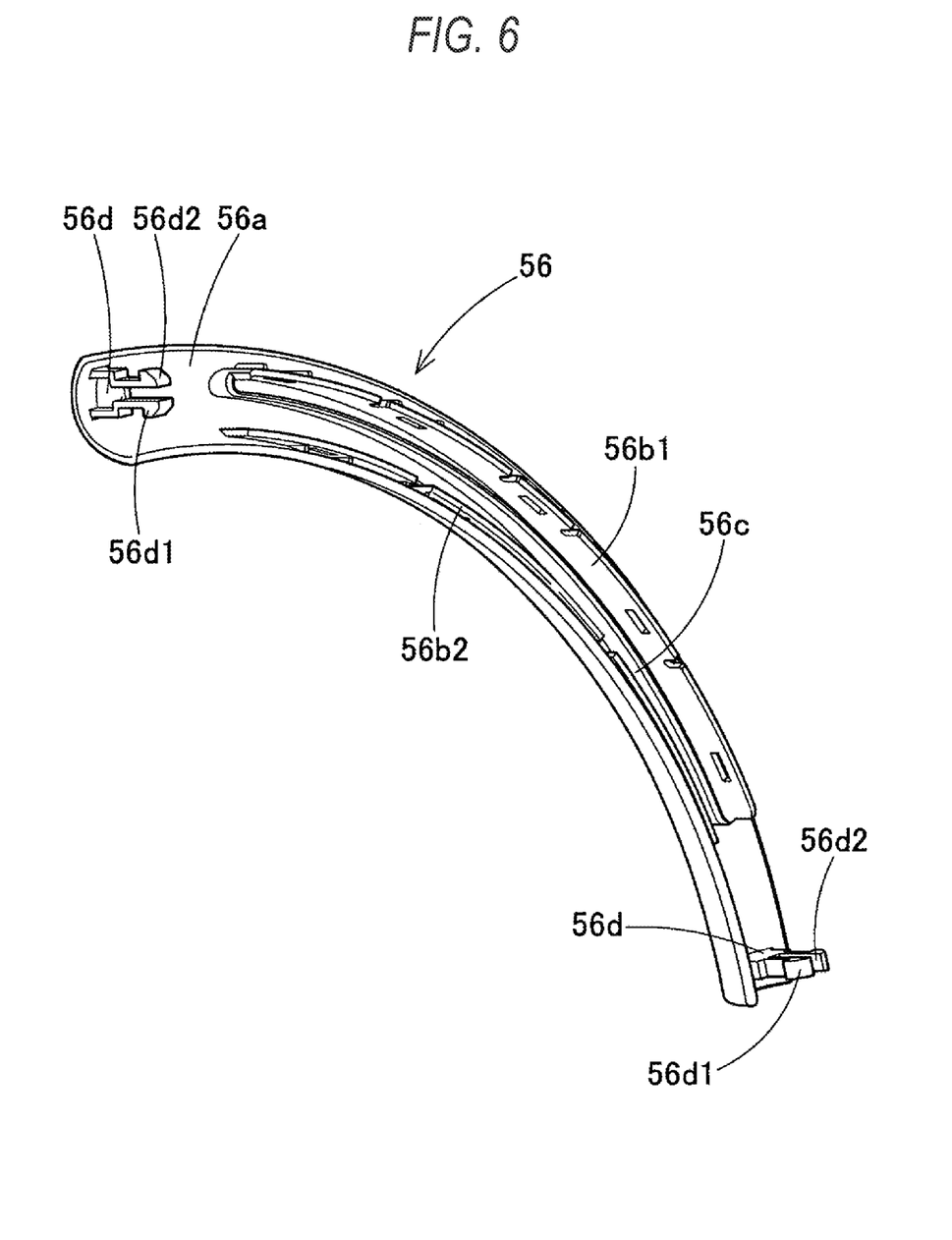
FIG. 6 is a perspective view of the rear cover of the lighting unit.
Figure 7:
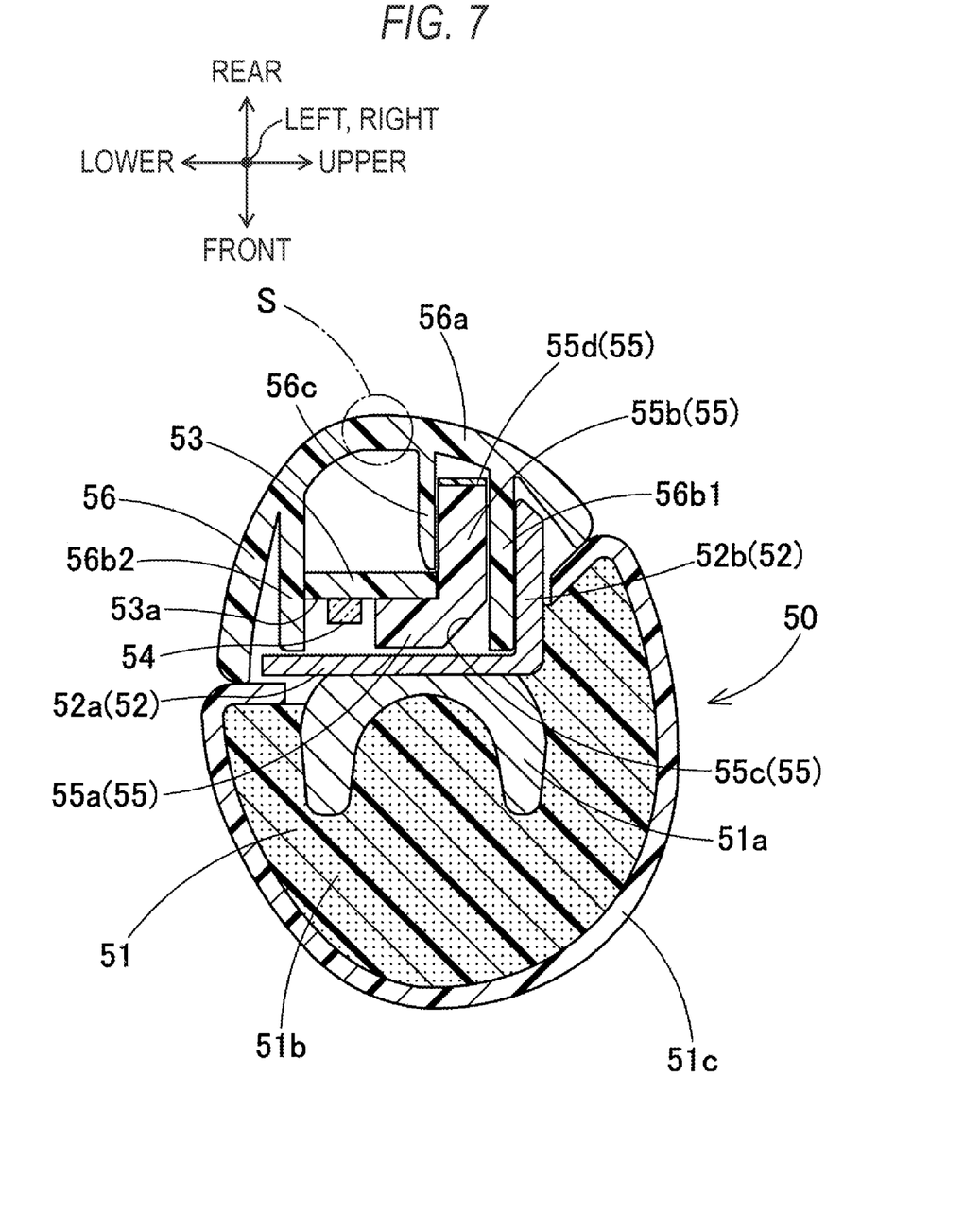
FIG. 7 is a cross-sectional view of the lighting unit.
Figure 8:
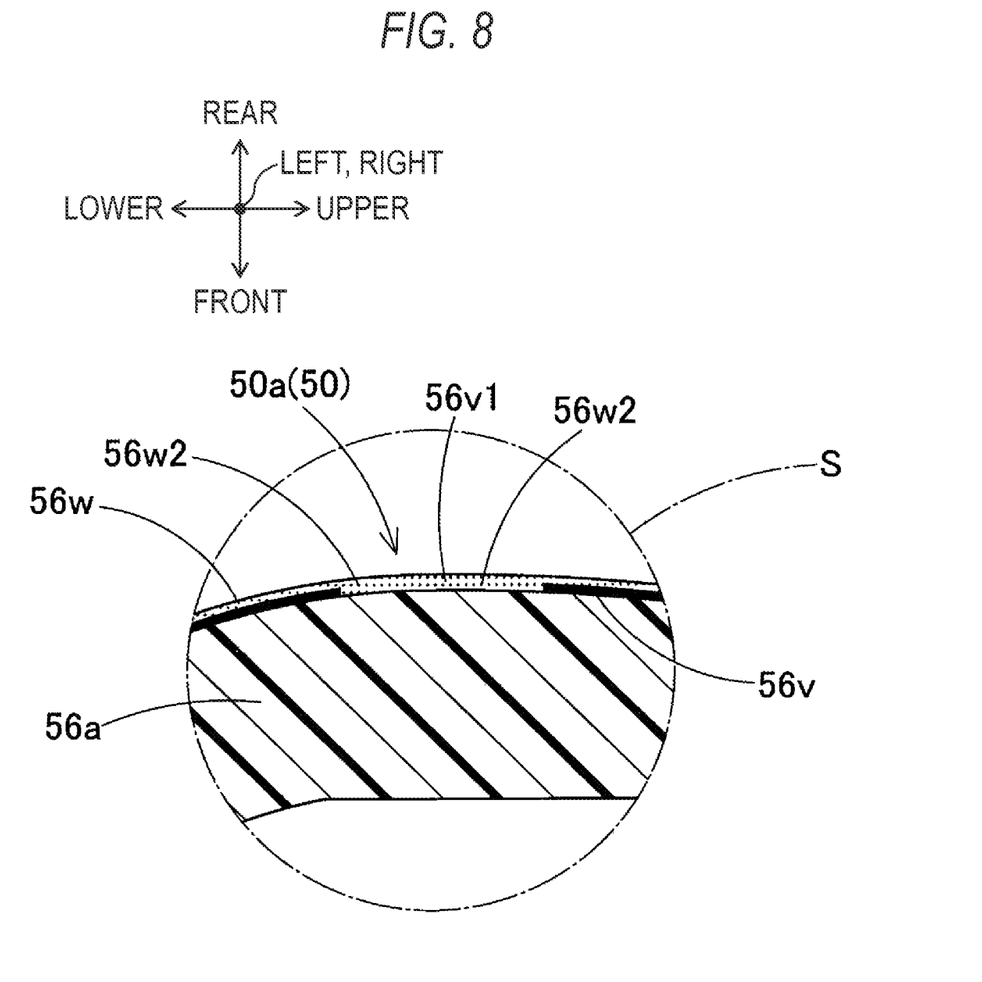
FIG. 8 is an enlarged cross-sectional view of a region S illustrated in FIG. 7.

Next, a detailed configuration of the lighting unit 50 will be described. FIG. 4 is a perspective view of the lighting unit 50 with a rear cover 56 removed. FIG. 5 is an exploded perspective view of the lighting unit 50. FIG. 6 is a perspective view of the rear cover 56 as viewed from a back side. FIG. 7 is a cross-sectional view of the lighting unit 50 taken along a line A2-A2 illustrated in FIG. 2. FIG. 8 is an enlarged cross-sectional view of a region S illustrated in FIG. 7.

As illustrated in FIGS. 4, 5, 6, and 7, the lighting unit 50 includes a base member 51, a case 52, a circuit board 53, LEDs 54 (light source) mounted on the circuit board 53, a light guide 55 (guide member) that guides light emitted from the LEDs 54, and the rear cover 56 (cover member).

The base member 51 is a member constituting a front surface side of the lighting unit 50, and has a shape curved along a curved shape of the steering part 1 as viewed from the front-rear direction. The base member 51 includes a metallic core member 51*a* integrally molded by die casting with the core member 1*a* provided in a part of the steering part 1 other than the lighting unit 50, an intermediate layer 51*b* covering the core member 51*a*, integrally molded with the intermediate layer 1*b* provided in a part of the steering part 1 other than the lighting unit 50 and having a cushioning property, and a front cover 51*c* constituting a part of a front surface of the steering part 1. Although the cross-sectional shape of the core member 51*a* is a substantially inverted U-shape similarly to the core member 1*a*, the thickness of a rear portion of the core member 51*a* is thin and flat in order to dispose other members of the lighting unit 50.

The case 52 is a metal member that is curved along the curved shape of the steering part 1 as viewed in the front-rear direction and has a substantially U-shaped cross section with an open rear side. The case 52 includes a plate-shaped bottom wall portion 52*a* curved along the curved shape of the steering part 1, and a side wall portion 52*b* extending rearward from an outer edge portion of the bottom wall portion 52*a*. The circuit board 53, the LEDs 54, and the light guide 55 are housed in a space surrounded by the bottom wall portion 52*a* and the side wall portion 52*b* of the case 52. The case 52 is attached to the base member 51 by disposing the bottom wall portion 52*a* on the core member 51*a* of the base member 51 and inserting and fastening screws 91 into screw holes 51*a*1 formed in the core member 51*a* and screw holes 52*a*1 formed in the bottom wall portion 52*a*.

The circuit board 53 is a member that is curved along the curved shape of the steering part 1 as viewed in the front-rear direction and has a length equivalent to the length of the case 52 in a longitudinal direction, and is housed inside the case 52. A mounting surface 53*a* of the circuit board 53 on which the LEDs 54 are mounted is provided on the front surface of the circuit board 53, and the circuit board 53 is disposed such that the mounting surface 53*a* and the bottom wall portion 52*a* of the case 52 are substantially parallel to each other. The circuit board 53 is placed on an incident portion 55*a* of the light guide 55 to be described later, and is attached to the case 52 by inserting and fastening screws 92 into screw holes 53*b* formed in the circuit board 53 and screw holes 52*a*2 formed in the bottom wall portion 52*a* of the case 52. In addition, the circuit board 53 is electrically connected to a control device (not illustrated) provided with the vehicle 70 by a cable (not illustrated), and the LEDs 54 mounted on the circuit board 53 are controlled by the control device.

The plurality of LEDs 54 are mounted at equal intervals along a peripheral direction (rotation direction) of the steering part 1 on the mounting surface 53*a* disposed on the front surface of the circuit board 53. In the present embodiment, a total of six LEDs 54, two each of which emits red light, green light, and blue light, are mounted. The LEDs 54 emit light under a control of the control device (not illustrated). Note that the number of LEDs 54 can be freely changed according to a required light amount, and all the emission colors may be the same color. Although the LED 54 is used as the light source in the present embodiment, another type of light source may be used as long as it is an electronic component that emits visible light.

The light guide 55 is a substantially L-shaped transparent member made of a synthetic resin such as an acrylic resin that transmits light emitted from the LED 54 and guides the light from the front surface side to the rear surface side of the circuit board 53 while diffusing the light therein. The light guide 55 has a shape curved along the curved shape of the steering part 1 as viewed from the front-rear direction, and a length thereof in the longitudinal direction is slightly shorter than a length of the case 52 in the same direction. The light guide 55 is disposed in front of the mounting surface 53a of the circuit board 53 so as to face the mounting surface 53a and the LEDs 54, and includes the incident portion 55a extending along the vertical direction and an emission portion 55b bent substantially perpendicularly from the incident portion 55a and extending rearward toward the rear cover 56. A deflection surface 55c that deflects the light incident on the incident portion 55a rearward is provided on a bent portion of the light guide 55 from the incident portion 55a to the emission portion 55b. A white diffusion sheet 55d (sheet for light diffusion) for diffusing light is attached to a rear end portion of the emission portion 55b. The incident portion 55a of the light guide 55 is placed on convex portions 52a3 formed on the bottom wall portion 52a of the case 52, and the light guide 55 is sandwiched between the bottom wall portion 52a and the circuit board 53 in the front-rear direction, whereby the light guide 55 is positioned in the front-rear direction. The light emitted from the LED 54 enters the incident portion 55a of the light guide 55, is deflected by the deflection surface 55c, enters the emission portion 55b, and is emitted rearward from the emission portion 55b while being diffused by the diffusion sheet 55d.

The rear cover 56 is a member constituting a part of the rear surface of the steering part 1, and has a curved shape along the curved shape of the steering part 1 as viewed in the front-rear direction. The rear cover 56 is formed of a transparent black synthetic resin having transparency, and a light transmittance of a portion other than a portion where a light shielding layer 56v and a matte layer 56w to be described later are provided is set to a range of 10% to 30% inclusive in total light transmittance. In the present embodiment, the rear cover 56 is made of bioengineering plastic using isosorbide as a main raw material, and the light transmittance is set by adjusting the content of a pigment.

The rear cover 56 is curved along the curved shape of the steering part 1 as viewed in the front-rear direction, covers the base member 51, the case 52, the circuit board 53, the LEDs 54, and the light guide 55 from the rear, and includes a base portion 56a constituting a part of the rear surface of the steering part 1, and two ribs 56b1 and 56b2 protruding forward from a front surface of the base portion 56a. The rear cover 56 includes a positioning protrusion 56c disposed between the ribs 56b1 and 56b2 in the front-rear direction and protruding forward from the front surface of the base portion 56a, and claw portions 56d provided at both end portions of the base portion 56a in the longitudinal direction and protruding forward from the front surface of the base portion 56a.

The ribs 56b1 and 56b2 are provided to ensure the strength of the base portion 56a, and are disposed in parallel in the front-rear direction and extend substantially in parallel to each other. The rib 56b1 is disposed adjacent to the emission portion 55b of the light guide 55 in the front-rear direction and extends substantially parallel to the emission portion 55b. The positioning protrusion 56c is disposed adjacent to the emission portion 55b of the light guide 55 in the front-rear direction, and extends substantially parallel to the emission portion 55b and the ribs 56b1 and 56b2. That is, the emission portion 55b of the light guide 55 is sandwiched between the rib 56b1 and the positioning protrusion 56c in the front-rear direction, whereby the position in the front-rear direction is determined. In addition, since the light transmittance of the rib 56b1 and the positioning protrusion 56c is lower than that of the light guide 55, the light passing through the emission portion 55b is suppressed from leaking to the outside when the emission portion 55b is sandwiched between the rib 56b1 and the positioning protrusion 56c.

Each of the claw portions 56d is formed of two protrusions 56d1 and 56d2, and is inserted into a fitting hole 51d of the base member 51 in order to mount the rear cover 56 to the base member 51. The protrusions 56d1 and 56d2 of the claw portion 56d are inserted into the fitting hole 51d in a state of being elastically deformed so as to be close to each other by coming into contact with an inner peripheral portion of the fitting hole 51d, and are prevented from coming off from the fitting hole 51d by restoring a distance between the protrusions 56d1 and 56d2 to an original distance by a restoring force.

As illustrated in FIG. 8, the light shielding layer 56v (light reduction layer) and the matte layer 56w are laminated on the rear surface (front surface, outer peripheral surface) of the base portion 56a of the rear cover 56. The light shielding layer 56v is formed by applying a black paint to the rear surface of the base portion 56a, and is configured to have a light transmittance lower than that of the base portion 56a. In the present embodiment, the total light transmittance of the light shielding layer 56v is set to 0%. Further, the light shielding layer 56v is partially removed by laser cutting, and an opening portion 56v1 for allowing passage of light emitted from the LEDs 54 is formed therein. In the present embodiment, the opening portion 56v1 is formed in a substantially central portion in a width direction of the steering part 1 in the light shielding layer 56v and in a region other than a peripheral end portion of the steering part 1. The rear cover 56 allows the light emitted from the LEDs 54 to pass through the base portion 56a and the matte layer 56w filled in the opening portion 56v1 and to be emitted toward the driver M side. That is, the light emission portion 50a of the lighting unit 50 illustrated in FIG. 8 is a portion where the opening portion 56v1 of the light shielding layer 56v of the rear cover 56 is formed. A method for forming the opening portion 56v1 in the light shielding layer 56v is not limited to laser cutting, and for example, a masking tape may be attached to a portion where the opening portion 56v1 is to be formed when coating is applied. However, when a masking tape is used, since burrs are likely to be formed on an end surface of the masking tape, laser cutting is preferable in order to improve the appearance.

The matte layer 56w is disposed on a rear end surface (outermost surface) of the rear cover 56, and is formed by applying a paint containing fine particles 56w2 for matting in a transparent resin to a rear surface of the light shielding layer 56v and a portion corresponding to the opening portion 56v1 of the light shielding layer 56v on the rear surface of the base portion 56a. That is, the matte layer 56w is provided on the surface of the light emission portion 50a of the lighting unit 50 illustrated in FIG. 7. The fine particles 56w2 for matting cause the light incident on the matte layer 56w to be irregularly reflected to produce a matting effect. In the present embodiment, silica is used as the fine particles 56w2, but other substances may be used. The matte layer 56w protects the base portion 56a by coating a surface side of the base portion 56a including the light shielding layer 56v. In the present embodiment, the total light transmittance of the matte layer 56w is set to about 70% to 90%.

Next, a lighting operation of the lighting unit 50 and an influence of the sun light will be described. First, when the continuous driving time of the vehicle 70 becomes equal to or longer than the predetermined time, the LED 54 emits light (turns on) based on a control signal of the control device (not illustrated). The light emitted from the LED 54 enters the incident portion 55a of the light guide 55, is deflected by the deflection surface 55c, enters the emission portion 55b, and is emitted rearward from the emission portion 55b while being diffused by the diffusion sheet 55d. The light emitted from the emission portion 55b is incident on the rear cover 56. Then, the light passes through the base portion 56a of the rear cover 56, the opening portion 56v1 of the light shielding layer 56v, and the matte layer 56w, and is emitted rearward from the rear surface of the matte layer 56w while being irregularly reflected by the fine particles 56w2 of the matte layer 56w.

When the sun light is incident on the rear cover 56 during daytime driving, the sun light is irregularly reflected by the fine particles 56w2 of the matte layer 56w on the surface (rear surface) of the rear cover 56. As a result, the light amount of sun light regularly reflected by the surface of the rear cover 56 and reaching eyes of the driver M is reduced, and the light emitted from the LED 54 is easily recognized by the driver M. As described above, according to the configuration of the present embodiment, since the matte layer 56w is provided on the surface of the rear cover 56, it is possible to prevent the driver M from having difficulty in recognizing the light emitted from the LED 54 inside the steering part 1 due to the influence of the sun light. In addition, since the light emitted rearward from the rear cover 56 is irregularly reflected by the fine particles 56w2 of the matte layer 56w, the light can be uniformly emitted from the rear cover 56.

The LED 54 is mounted on the front surface of the circuit board 53, and light emitted from the LED 54 is guided from the front surface side to the rear surface side of the circuit board 53 while being diffused by the light guide 55. Therefore, as compared with a configuration in which the LED 54 is mounted on a surface of the circuit board 53, a length of an optical path in the light guide 55 can be increased, and therefore the light is easily diffused in the light guide 55, and light is easily emitted uniformly from the rear cover 56. In addition, in a case where the LEDs 54 having different emission colors are provided and mixed as in the present embodiment, since the light is easily mixed in the light guide 55, occurrence of color unevenness can be suppressed.

Since the diffusion sheet 55d attached to a rear end portion of the light guide 55 is white, the sun light passing through the rear cover 56 is likely to be reflected by the surface (rear surface) of the diffusion sheet 55d, and the light emitted from the LED 54 when the sun light reaches the eyes of the driver M is less likely to be recognized by the driver M. In contrast, in the present embodiment, the total light transmittance of the base portion 56a of the rear cover 56 is set in a range of 10% to 30% inclusive. Therefore, since the light amount of the sun light incident on the diffusion sheet 55d and the light amount of the sun light reflected by the diffusion sheet 55d are reduced by the base portion 56a, and the sun light is less likely to be emitted from the rear cover 56 to the driver M side and is less likely to reach the eyes of the driver M, it is possible to further prevent the driver M from having the difficulty in recognizing the light emitted from the LED 54 due to the influence of the sun light. In addition, since the total light transmittance of the base portion 56a of the rear cover 56 is set to be low, members in the rear cover 56 are less likely to be visually recognized by the driver M when the LED 54 is not turned on, and the design of the steering wheel 10 can be improved.

In the present embodiment, the lighting unit 50 is provided in the region between the left and right spoke portions 3a and 3b of the steering part 1, but the present invention is not limited thereto. That is, even when the lighting unit 50 is disposed at another position of the steering part 1 or disposed over the entire area of the steering part 1, the same effect as described above can be obtained.

Although the steering wheel 10 including the circular ring-shaped steering part 1 has been described in the present embodiment, the present invention is not limited thereto. That is, even when the lighting unit 50 is provided in the steering part 1 having another shape such as a square ring shape or a bar shape, the same effect as described above can be obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A steering wheel comprising:
   a boss portion connected to a steering center shaft of a vehicle;
   a steering part configured to be gripped by a driver of the vehicle and steered by being rotated about the steering center shaft;
   a light source provided inside the steering part;
   a light emission portion provided on at least a portion of the steering part, and configured to transmit light emitted from the light source to emit the light from a rear surface of the steering part, in which the rear surface of the steering part is directed in a direction of the vehicle as viewed from the driver,
   wherein the light emission portion has a matte layer on a surface of the light emission portion, the matte layer having transparency and containing fine particles for matting; and
   a cover member covering the light source and at least one part of the light emission portion,
   wherein the cover member includes:
      a base portion having transparency;
      a light reduction layer formed by applying a paint to a rear surface of the base portion, and the light reduction layer having a lower transparency than the base portion, in which an opening portion forming the light emission portion is provided on the light reduction layer; and
      the matte layer formed by applying a paint to a rear surface of the light reduction layer and a portion of the base portion corresponding to the opening portion.

2. The steering wheel according to claim 1,
   wherein the opening portion of the light reduction layer is formed by laser cutting.

3. The steering wheel according to claim 1, further comprising:
- a circuit board on which the light source is mounted, in which the light source is mounted on a mounting surface disposed on a front surface of the circuit board; and
- a guide member configured to guide light emitted from the light source from a front surface side to a rear surface side of the circuit board.

4. The steering wheel according to claim 3,
- wherein a white sheet for light diffusion is attached to a rear end portion of the guide member, and
- a total light transmittance of the base portion is set in a range of 10% to 30% inclusive.

* * * * *